Patented Oct. 17, 1944

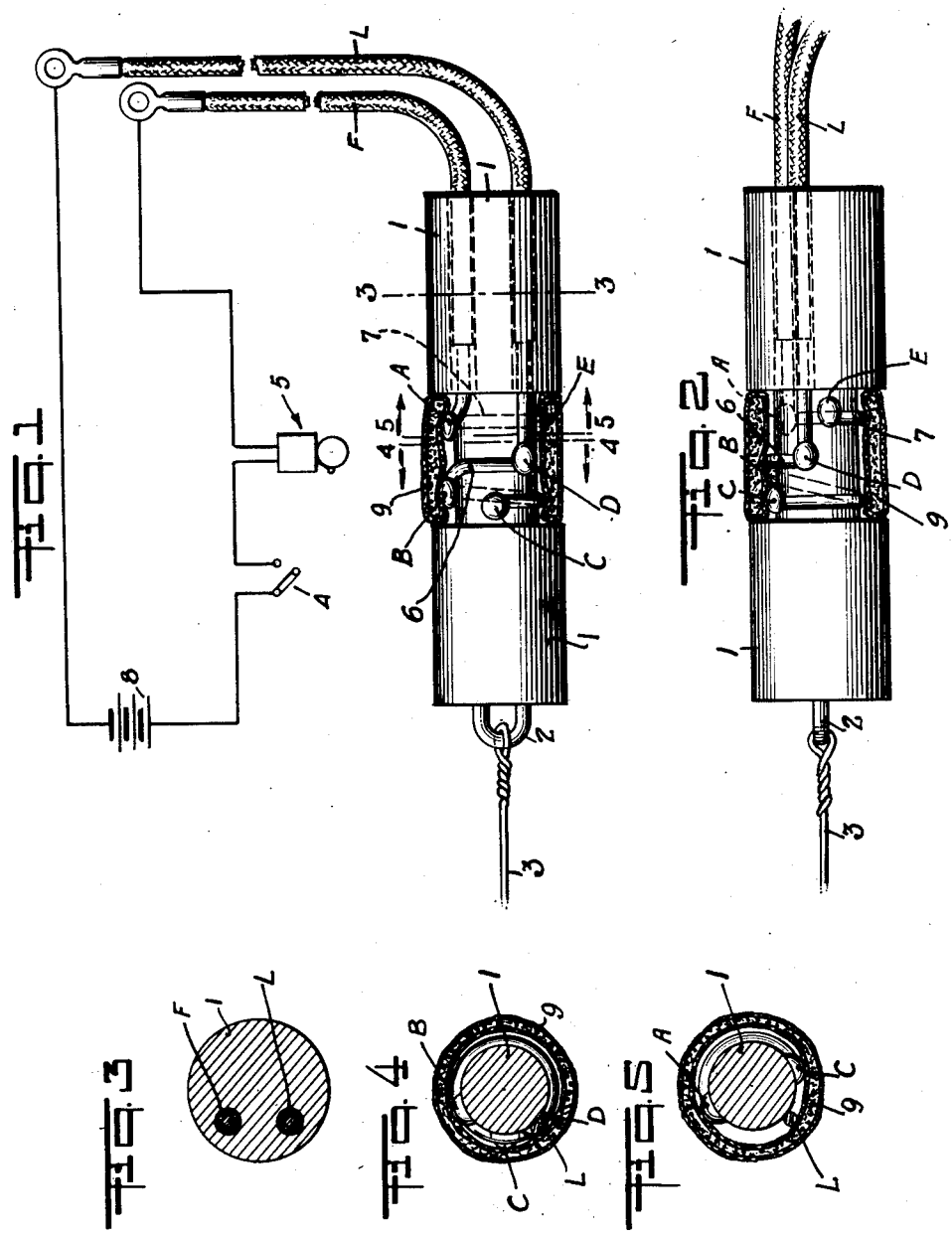

2,360,434

UNITED STATES PATENT OFFICE 2,360,434

LEAK-LOCATING APPARATUS

Dennis J. Manning, Mountainside, N. J.

Application July 29, 1943, Serial No. 496,646

6 Claims. (Cl. 177—311)

My invention relates to a new and improved apparatus for detecting the location of a leak in a gas pipe line or gas main or the like. Such gas mains are laid in a general horizontal line, with variations from said horizontal line which follow the change in grade of the ground. Hence, if said pipe-line leaks, water can accumulate in said pipe-line, intermediate the ends thereof. These gas pipe-lines are located under the surface of the earth.

One of the objects of my invention is to locate a place where there is a break in a gas main or the like, through which water leaks from the ground into said gas main.

Another object of my invention is to provide a simple testing device which can be moved through the gas main and which will quickly indicate the location of the leak at an observing station which is located out of the gas main.

Other objects of my invention will be stated in the annexed description and illustrated in the drawing.

Fig. 1 is a diagrammatic view which illustrates the method of using the improved device. Said Fig. 1 also shows an elevation of the improved device, the representation of the holder for the undissolved electrolyte being shown in cross section.

Fig. 2 is an elevation of said device, similar to that shown in Fig. 1, taken at the side opposite to the side which is shown in Fig. 1; that is, if the device as shown in Fig. 1 is turned 180° around its longitudinal axis, the resultant view is shown in Fig. 2.

Figs. 3, 4 and 5 are sectional views, taken respectively along the lines 3—3, 4—4, and 5—5, of Fig. 1.

At the present time, it is extremely difficult to detect the location of a leak in a gas main or the like. Such leaks are dangerous and due to the difficulty of locating such leaks, it has been common practice to pump the water out of the leaky main at regular intervals, for long periods of time. According to the present method, it is necessary to drill holes in the pipe or main at short distances apart, and to insert an inflatable balloon stopper through each hole. If one of these test holes is located right at the leak, and the inflatable balloon stopper is inflated, such inflated stopper then dams the water. If one of the test holes is not made exactly at the leak, it is necessary to guess at the exact location of the leak.

According to my invention, tapped openings are provided in the pipe or main, about 100 feet or more apart. These tapped openings can be provided with removable plugs.

The testing body 1 of the device is made of any suitable non-metallic and non-conductive material, such as wood or the like. The front of the body 1 is provided with an eye 2 to which a flexible cable 3 or the like can be connected, in order to pull the device through the section of the pipe or main which is being tested.

At its rear end, the body 1 is provided with longitudinal bores through which the bared ends of insulated wires F and L are inserted. The bared end of the insulated wire F terminates in a metal head A, which is suitably fixed to the median recessed part of the body 1. The bared end of the insulated wire L terminates in a metal head D, which is also fixed to said recessed part of the body 1. The insulated wires F and L extend out of the main or pipe which is being tested, to any suitable observation station, which may be located above the ground or at any other convenient place. The insulated wires F and L are flexible and they are of any suitable length. Said wires F and L are connected to a battery 8, through a circuit which includes a hand-operated switch 4 and a signal device 5 which may be a bell or an electric lamp or the like. This signal device is located at the observation station. Hence, if the bared ends of the wires are connected by means of a conductive electrolyte, and the switch 4 is closed, the signal 5 will advise the observer of the location of the leak.

A lateral wire 6, which is arranged helically in a single transverse turn of about 360°, is connected to the head D. Said wire 6 has an end-head C and an intermediate head B, both made of metal. The metal head A is connected to a metal head E by a lateral wire 7. The head E is spaced from the head D. The aforesaid heads and wires which are located in the recess of the body 1, are fixed to the cylindrical wall of said recess in any suitable manner.

A cylindrical envelope or carrier 9, made of cloth which is impregnated with sodium chloride or other suitable electrolyte, is fixed in the recess of the body 1. The outer wall of said carrier or envelope 9 may be flush with the outer periphery of the body 1. Said envelope or carrier 9 is applied in the dry condition, and it is held firmly in position by means of binding tapes or the like.

When the device is pulled to the location of the leak, the water moistens the sodium chloride or the like, thus providing a conductive electrolyte between the wires F and L in the recess of the body 1. This closes the circuit of the battery 8, since the switch 4 is closed before the test is begun. The signal 5 will thus accurately indicate the location of the leak. Even if the body 1 is turned or twisted around its longitudinal axis as it is pulled through the portion of the pipe or main which is being tested, the electrolyte will close the circuit in position, between the exposed ends of the wires F and L. The inner wall of said envelope or carrier 9 is held in firm contact with the respective exposed heads and wires which are located in the recess of the body 1. Hence, the circuit is closed as soon as the envelope or carrier 9 is moistened. Said envelope or carrier 9 consists of any suitable absorbent fabric. In order to impregnate said envelope or carrier 9 with sodium chloride or other salt which is conductive in aqueous solution, said porous fabric is dipped into a solution of the electrolyte, and the cloth is then dried after it has been removed from said solution.

The use of the impregnated carrier 9 is a substantial feature of the invention. Ordinary water is a very poor conductor. If the device were used without the impregnated carrier or envelope 9, it would require a high voltage to close the circuit at the location of the leak. Such high voltage might cause the current to jump from the exposed ends of the wires to the wall of the metal pipe, thus closing the circuit at a point spaced from the leak.

Instead of using a carrier which is impregnated with sodium chloride, or other water soluble electrolyte, such electrolyte can be packed in powder form in the recess of the body 1, and such packed electrolyte can be held in place by a suitable wrapping of a porous cloth. Likewise, and as shown in Figs. 1 and 2, the member 9 can be a bag made of porous cloth, which is filled with salt or the like. Said bag is tied in cylindrical form around the recessed portion of the body 1.

The wires and their heads which are located in the recess of body 1, are preferably located wholly within the outer edge of said recess. Said recess is preferably annular, so that it extends completely around the cylindrical body 1. The body 1 may have any desired shape. The carrier for the dry sodium chloride or other electrolyte may be paper or any absorbent material. The heads A, B, C, and D may be formed by drops of solder, which connect the respective wires to the inner cylindrical wall of said recess. The member or carrier 9 is held firmly pressed against said heads, so that when said carrier 9 is moistened, and before any substantial amount of sodium chloride or the like has been dissolved, the circuit will be closed at said recess.

I have described a preferred embodiment of my invention, but it is clear that numerous changes and omissions and additions can be made without departing from the spirit.

For example, the body 1 can be made of any material, including metal, if such conductive material has an insulating layer. The invention covers any device whereby the inner ends of wires F and L are in circuit-opening relation, until they are connected through a moistened electrolyte or a solution of an electrolyte, or until the circuit of said wires F and L is closed at their inner ends by the presence of water at such inner ends, in any manner.

The voltage of battery 8 may be six volts.

In effect, the uninsulated inner end of wire F extends laterally half-way, or 180°, around the body 1, between heads A and D, since wire 7 can be considered as being a lateral extension of wire F. The lateral extension of wire L extends completely, namely 360°, laterally around the body. Hence both uninsulated inner ends of said wires F and L extend laterally completely around the body 1.

The heads A, B, C, D, and E are thicker than their respective wires, so that said heads extend radially outwardly from said wires. Hence said heads are partially embedded in the flexible member 9, thus ensuring firm contact between said heads and said member 9. The improved device can detect the presence of water, even if its depth is very small. The envelope which encloses the dry electrolyte extends transversely around the testing body, and the external periphery of said envelope is flush with or it extends transversely around the testing body.

Hence, as soon as the bottom portion of the dry electrolyte is wetted, the circuit of the signal device is quickly closed.

I claim:

1. A device for use in detecting a water leak in a gas pipe-line which is located below the surface of the earth and whose direction is sufficiently close to the horizontal plane so that water can accumulate in said pipe line between its ends through said leak, said device having a testing circuit, said testing circuit including a source of electric power and a signal device operable by the current of said source and respective wires, said respective wires having respective inner bare ends which are mounted on a testing body which is dimensioned to be moved through a section of said pipe line in order to test said section, means for moving said body through said pipe line, said inner ends being normally insulated from each other in the absence of water, to keep said circuit open in the absence of water in said pipe-line, a mass of dry water-soluble material held in conductive relation with said bare inner ends, the said dry material being non-conductive, the aqueous solution of said dry material being conductive when dissolved in water, said signal device being connected to said wires at a sufficient distance from said testing body so that said signal device remains above the surface of the earth while said testing body is moved through the portion of the pipe line which is tested, said dry material being located to be wetted by water in said pipe-line.

2. A device according to claim 1, in which said bare ends are held fixed to said testing body.

3. A device according to claim 1, in which said bare ends are held fixed to said body, and said dry material is fixed to said body transversely outwardly relative to said bare ends.

4. A device according to claim 1, in which said bare ends and said dry material extend substantially wholly around said body in a transverse direction.

5. A device according to claim 1 in which said bare ends are held fixed to said body, said bare ends extending transversely substantially wholly around said body, said mass being located in a water-absorbent envelope which surrounds said bare ends.

6. A device according to claim 1 in which said bare ends are held fixed to said body, said bare ends extending transversely substantially wholly around said body, said mass being located in a water-absorbent carrier which surrounds said bare ends.

DENNIS J. MANNING.